US012617143B2

(12) United States Patent
Haase et al.

(10) Patent No.: US 12,617,143 B2
(45) Date of Patent: May 5, 2026

(54) THERMOFORMING OVEN WITH SEPARATING HEATING ELEMENTS

(71) Applicant: BROWN LLC, Beaverton, MI (US)

(72) Inventors: Petrus Wilhelmus Maria Haase, Beaverton, MI (US); Hannes Groeger, Beaverton, MI (US)

(73) Assignee: BROWN LLC, Beaverton, MI (US)

( * ) Notice: Subject to any disclaimer, the term of this patent is extended or adjusted under 35 U.S.C. 154(b) by 2 days.

(21) Appl. No.: 18/808,729

(22) Filed: Aug. 19, 2024

(65) Prior Publication Data

US 2025/0249636 A1    Aug. 7, 2025

Related U.S. Application Data

(60) Provisional application No. 63/550,404, filed on Feb. 6, 2024.

(51) Int. Cl.
 *B29C 51/42*        (2006.01)
 *B29C 51/18*        (2006.01)

(52) U.S. Cl.
 CPC ............ B29C 51/425 (2013.01); B29C 51/18 (2013.01)

(58) Field of Classification Search
 CPC .............................. B29C 51/425; B29C 51/18
 USPC .......................................................... 432/122
 See application file for complete search history.

(56) References Cited

U.S. PATENT DOCUMENTS

2020/0269487 A1*    8/2020   Dando .................. B29B 13/023

FOREIGN PATENT DOCUMENTS

| CN | 103042692 | B | 2/2014 |
|----|-----------|---|--------|
| CN | 107009630 | A | 8/2017 |
| CN | 210552993 | U | 5/2020 |
| CN | 218749265 | U | 3/2023 |
| EP | 0798094 | A1 | 10/1997 |

OTHER PUBLICATIONS

International Search Report and Written Opinion in related PCT Application PCT/US2025/013499 mailed May 16, 2025, 10 pages.

* cited by examiner

*Primary Examiner* — Steven B McAllister
*Assistant Examiner* — Charles R Brawner
(74) *Attorney, Agent, or Firm* — HOVEY WILLIAMS LLP

(57)        ABSTRACT

An apparatus for supporting heating elements of a thermoformer oven includes a first heating element support frame, a second heating element support frame, and one or more actuator. The first heating element support frame is operable to support one or more of the heating elements on a first side of a surface for supporting material to be thermoformed. The second heating element support frame is operable to support one or more of the heating elements on the first side of the surface. The one or more actuator is configured to shift the first and second heating element support frames toward one another in directions with vector components of motion parallel to the surface.

11 Claims, 10 Drawing Sheets

1000

1001

POSITION MATERIAL TO BE HEATED FOR THERMOFORMING WITHIN THERMOFORMER OVEN

1002

SHIFT HEATER BANKS TOWARD ONE ANOTHER OVER THE MATERIAL

1003

SHIFT THE HEATER BANKS TOWARD THE PRESS

1004

HEAT THE MATERIAL VIA THE HEATING ELEMENTS OF THE HEATER BANKS

1005

RETRACT THE HEATER BANKS FROM THE PRESS AND SEPARATE THE HEATER BANKS FROM ONE ANOTHER

THERMOFORMING OVEN WITH SEPARATING HEATING ELEMENTS

CROSS-REFERENCE TO RELATED APPLICATIONS

The current patent application is a non-provisional utility patent application which claims priority benefit, with regard to all common subject matter, of earlier-filed U.S. Provisional Application Ser. No. 63/550,404; titled "THERMO-FORMING OVEN WITH SEPARATING HEATING ELEMENTS"; and filed Feb. 6, 2024. The Provisional Application is hereby incorporated by reference, in its entirety, into the current patent application.

BACKGROUND

A thermoforming system includes an oven for heating sheets of material to be thermoformed at the press. One existing oven used for this purpose is a c-style oven having heater banks that are the full width of the tooling with top and bottom heater banks that are either independent or connected via a frame. This type of oven is usually driven by multiple air cylinders to move the heater banks over the sheets and inwards toward the tooling and then to retract the heaters away from the tooling. Another existing oven is a clam shell type oven having heater banks that are also the full width of the tooling. The top heater bank pivots up and the bottom heater bank pivots down. The heater banks are also usually driven by multiple air cylinders to move the oven over the sheet and in towards tool. This type of oven requires the sheets of material to be removed after the machine is stopped. Thus, there is a need for an improved thermoformer oven.

The background discussion is intended to provide information related to the present invention which is not necessarily prior art.

SUMMARY

The present invention solves the above-described problems and other problems by providing an improved apparatus for supporting heating elements, a thermoformer oven, and a method of heating material in a thermoforming process.

An apparatus for supporting heating elements of a thermoformer oven according to an embodiment of the present invention includes a first heating element support frame, a second heating element support frame, and one or more actuator. The first heating element support frame is operable to support one or more of the heating elements on a first side of a surface for supporting material to be thermoformed. The second heating element support frame is operable to support one or more of the heating elements on the first side of the surface.

The one or more actuator is configured to shift the first and second heating element support frames toward one another in directions with vector components of motion parallel to the surface. By positioning and shifting the heating elements on the same side above the sheet enables smaller heater banks, such as heating elements that are only half the width of a c-style oven, thereby making it possible to reduce the footprint of the thermoformer oven. It also enables accessing or reaching the heaters for maintenance and cleaning and obviates the need to remove thermoforming material from the thermoforming machine between production runs. This enables configurations where heater banks can be disconnected from the drive system and moved individually for maintenance. The one or more actuator can serve as a single drive mechanism, which simplifies maintenance compared to multi-cylinder mechanisms required to move heater banks of existing conventional ovens. The one or more actuator acting as a single drive mechanism simplifies the pneumatic controls performing the retraction, which is more reliable and avoids excessive sag. The split heaters also have a shorter retraction travel distance and therefore will be away from the plastic quicker than a conventional C-style oven, making it safer in case of excessive plastic sag.

A thermoformer oven constructed according to an embodiment of the invention includes a rail, a first heating element, a second heating element, and one or more actuator. The rail is operable to support material to be thermoformed along an imaginary plane and includes a first side and a second side opposite to the first side. The first heating element is positioned on the first side of the rail. The second heating element is also positioned on the first side of the rail. The one or more actuator is configured to shift the first and second heating elements toward one another in directions with vector components of motion parallel to the plane.

A thermoformer oven according to an embodiment of the present invention includes a frame, a proximal carriage, a distal carriage, a proximal heater bank, a distal heater bank, and one or more actuator. The one or more surface extends along a longitudinal axis for supporting material to be heated. The frame includes one or more gantry extending parallel to the one or more surface and transversely relative to the longitudinal axis. The proximal carriage assembly is configured to shift along the one or more gantry. The distal carriage assembly is positioned distal to the proximal carriage assembly and configured to shift along the one or more gantry. The proximal heater bank is operatively associated with the proximal carriage assembly. The distal heater bank is operatively associated with the distal carriage assembly. The one or more actuator is configured to shift the proximal carriage assembly and the distal carriage assembly toward one another along the one or more gantry.

A method of heating material for thermoforming according to an embodiment of the invention includes positioning the material on a first side of a surface in a thermoforming oven, wherein the thermoforming oven includes a first heating element, a second heating element, and one or more actuator. The first heating element is positioned on the first side of the surface. The second heating element is positioned on the first side of the surface. The one or more actuator is configured to shift the first and second heating elements toward one another in directions with vector components of motion parallel to the surface. The method further includes actuating, via the one or more actuator, the first heating element and the second heating element to shift the first and second heating elements toward one another; and heating, via the first and second heating elements, the material.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein.

Figure 1:
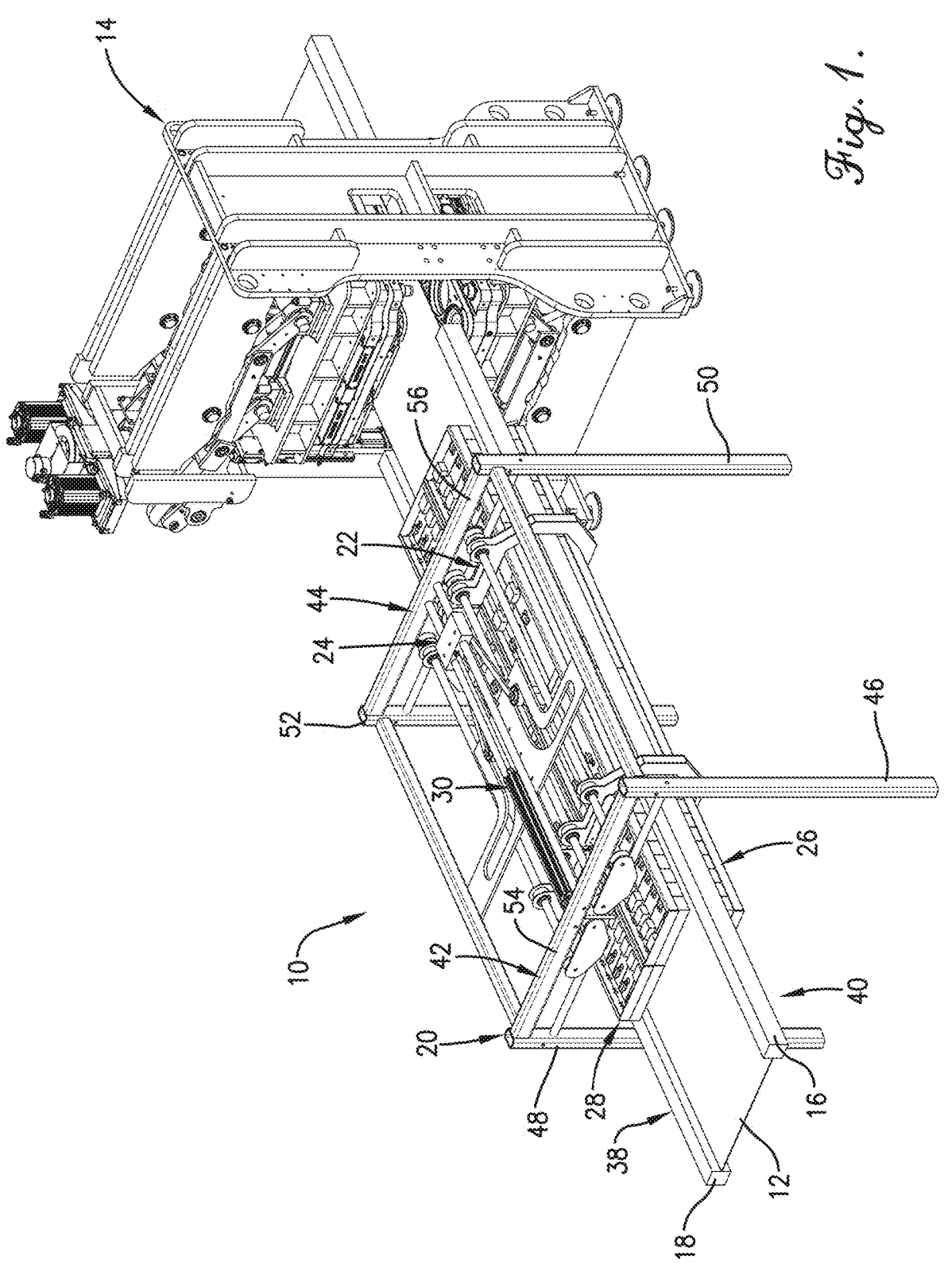
FIG. 1 is an elevated perspective view of a thermoformer oven constructed according to an embodiment of the present invention with its heating elements in a joined, heating state positioned over the material to be heated and positioned adjacent to a thermoformer press.

The drawing figures do not limit the present invention to the specific embodiments disclosed and described herein. The drawings are not necessarily to scale, emphasis instead being placed upon clearly illustrating the principles of the invention.

DETAILED DESCRIPTION

Turning to FIG. 1, a thermoformer oven 10 constructed according to an embodiment of the present invention is configured to heat material 12 for forming pressware products in a thermoformer press 14. The material 12 for thermoforming may include various types of plastic such as polystyrene, ABS (Acrylonitrile Butadiene Styrene), polyethylene, PVC (Polyvinyl Chloride), PET (Polyethylene Terephthalate), acrylic, and polycarbonate, among others. The type of plastic used depends on the specific requirements of the product being manufactured. The thermoformer oven 10 may be implemented in any type of thermoformer system and used in conjunction with any type of thermoformer press 14 without departing from the scope of the present invention.

Figure 2:
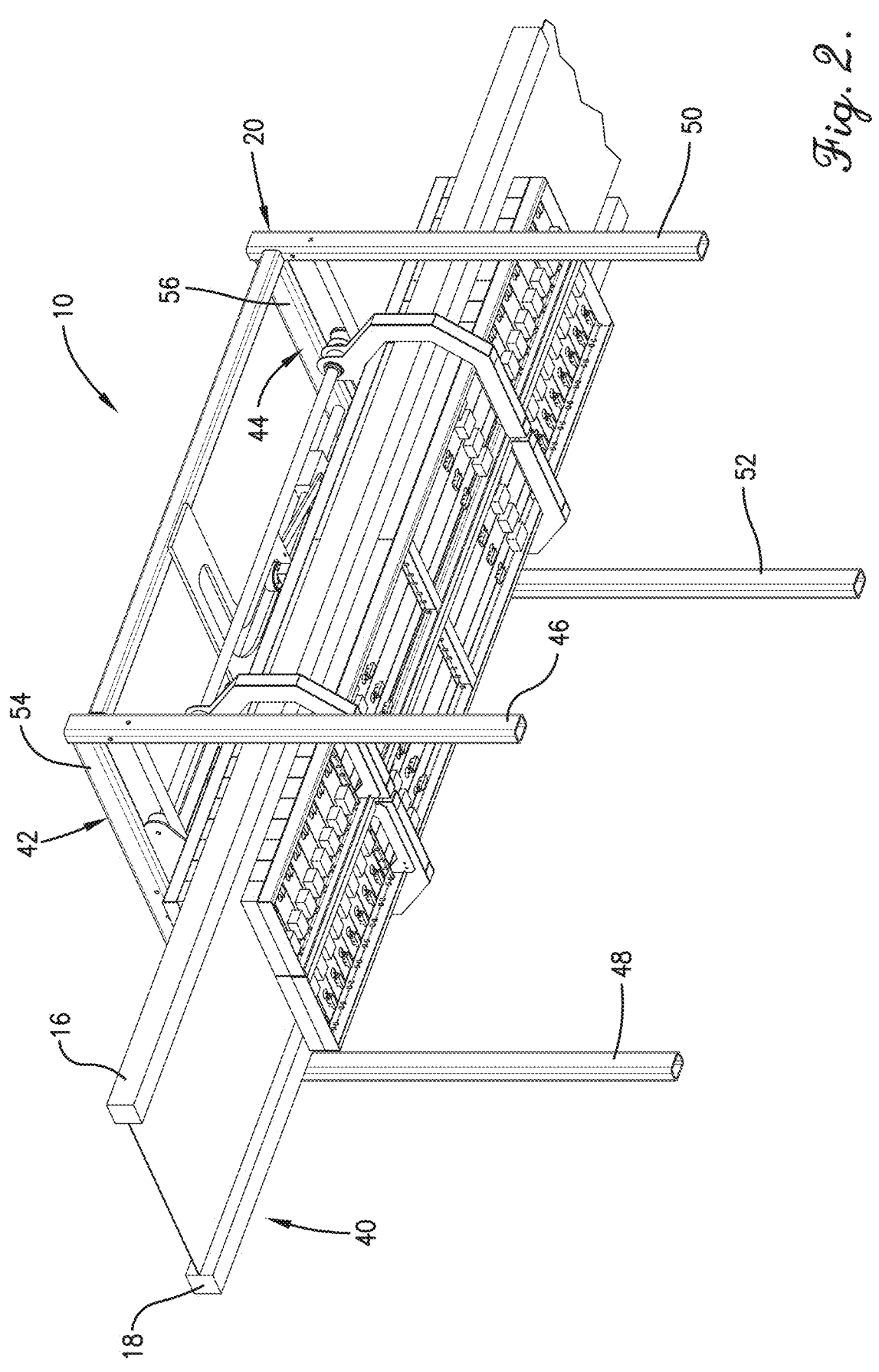
FIG. 2 is a lowered perspective view of the thermoformer oven of FIG. 1 with its heating elements in the joined, heating state.

The thermoformer oven 10 may comprise or be positioned along one or more rails 16, 18 extending along one or more longitudinal axis 19 (depicted in FIG. 5) and supporting and/or guiding the material 12 to be heated, a frame 20, a proximal carriage assembly 22, a distal carriage assembly 24, a proximal heater bank 26, a distal heater bank 28, and one or more actuator 30. In one or more embodiment, the rails 16, 18 define upper surfaces for supporting the material and extend parallel to one another and the longitudinal axis 19. The rails 16, 18 may define a top side 38 and a bottom side 40 opposite the top side 38, as shown in FIG. 2. The term "rails" refers to structures used as tracks, guides, or other types of supporting members for supporting and/or guiding the material 12 through the oven 10 and into the press 14. Further, the surface upon which the material 12 is supported may be a surface internal to the one or more rails 16, 18, such as an upward facing surface within a groove or channel that guides or directs the material 12 through the oven 10. In one or more embodiments, the rails 16, 18 may be parallel to one another and the longitudinal axis 19. In one or more embodiments, the rails 16, 18 may be non-parallel and diverging or converging in a certain direction.

The frame 20 supports various components of the oven 10. The frame 20 may be integrated into the thermoformer system frame or may be a stand-alone frame. In one or more embodiments, the frame 20 comprises one or more gantries 42, 44 extending over the rails 16, 18 in directions that are transverse to the rails 16, 18 and the longitudinal axis 19. While the gantries 42, 44 are depicted being above the rails 16, 18 and having girders (discussed more below) being transverse to the longitudinal axis 19, the frame 20 may have other configurations without departing from the scope of the present invention. For example, the girders may be extend parallel to the longitudinal axis 19 and be above and/or below the rails 16, 18. The gantries 42, 44 may have different configurations as well, such as one being above the rails 16, 18 and one being below the rails 16, 18.

In one or more embodiments, the gantries 42, 44 are spaced apart from each other longitudinally relative to the pair of rails 16, 18 and the longitudinal axis 19. The gantries 42, 44 include upright support legs 46, 48, 50, 52 that support the girders 54, 56. While the upright support legs 46, 48, 50, 52 are depicted extending from the floor, one or more of the legs may alternatively extend downwards from one or more support structure above the girders 54, 56.

Figure 3:
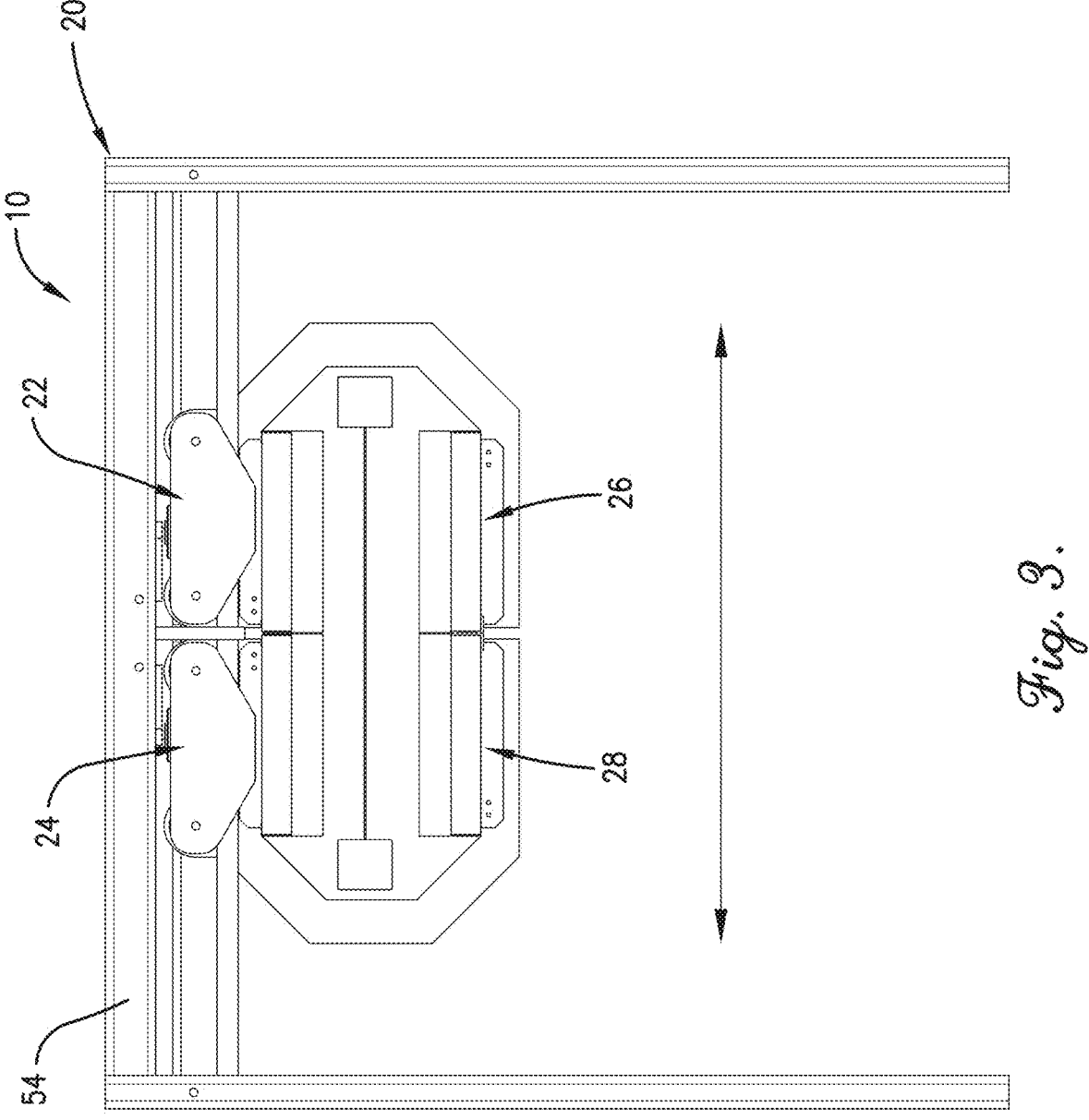
FIG. 3 is an end view of the thermoformer oven of FIG. 1 with its heating elements in the joined, heating state viewed along a longitudinal axis of the thermoformer oven extending into the page.
Figure 4:
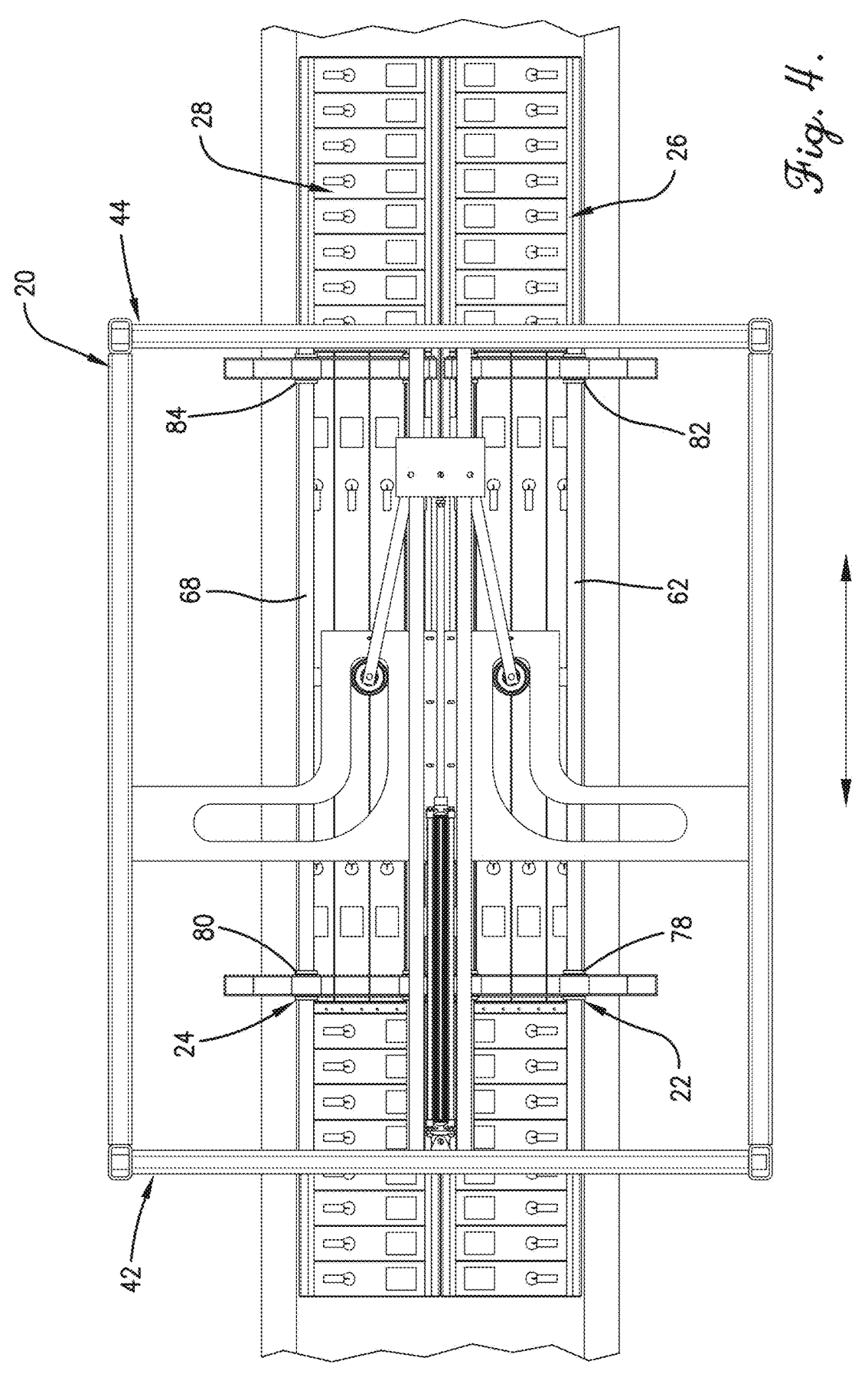
FIG. 4 is a top plan view of the thermoformer oven of FIG. 1 with its heating elements in the joined, heating state.

Turning to FIG. 3, the carriage assemblies 22, 24 support the heater banks 26, 28 and are operable to shift the heater banks 26, 28 relative to the frame 20. In one or more embodiments, the carriage assemblies 22, 24 are configured to extend and retract to shift the heater banks 26, 28 toward one another and apart from one another in directions (as indicated by the exemplary arrow) that are at least partially transverse to the longitudinal axis 19. In one or more embodiments, the carriage assemblies 22, 24 are configured to shift the heater banks 26, 28 in directions with vector components of motion parallel to the surface of the material and/or parallel to an imaginary plane extending onto the top surfaces of the rails 16, 18. As used herein, "with vector components of motion" means that the motion is movement at least partially along a certain axis (such as a horizontal x-axis) but may also include other vector components of motion along a different axis (such as a horizontal y-axis). In one or more embodiments, the carriage assemblies 22, 24 are configured to shift the heater banks 26, 28 along planes that are parallel to a plane defined by the top surfaces of the rails 16, 18. The carriage assemblies 22, 24 may shift the heater banks 26, 28 toward one another along any number of paths without departing from the scope of the present invention. Turning to FIG. 4, in one or more embodiments, the carriage assemblies 22, 24 are also configured to extend and retract to shift the heater banks 26, 28 in directions (indicated by the exemplary arrow) with vector components of motion that are parallel to the longitudinal axis 19.

Figure 5:
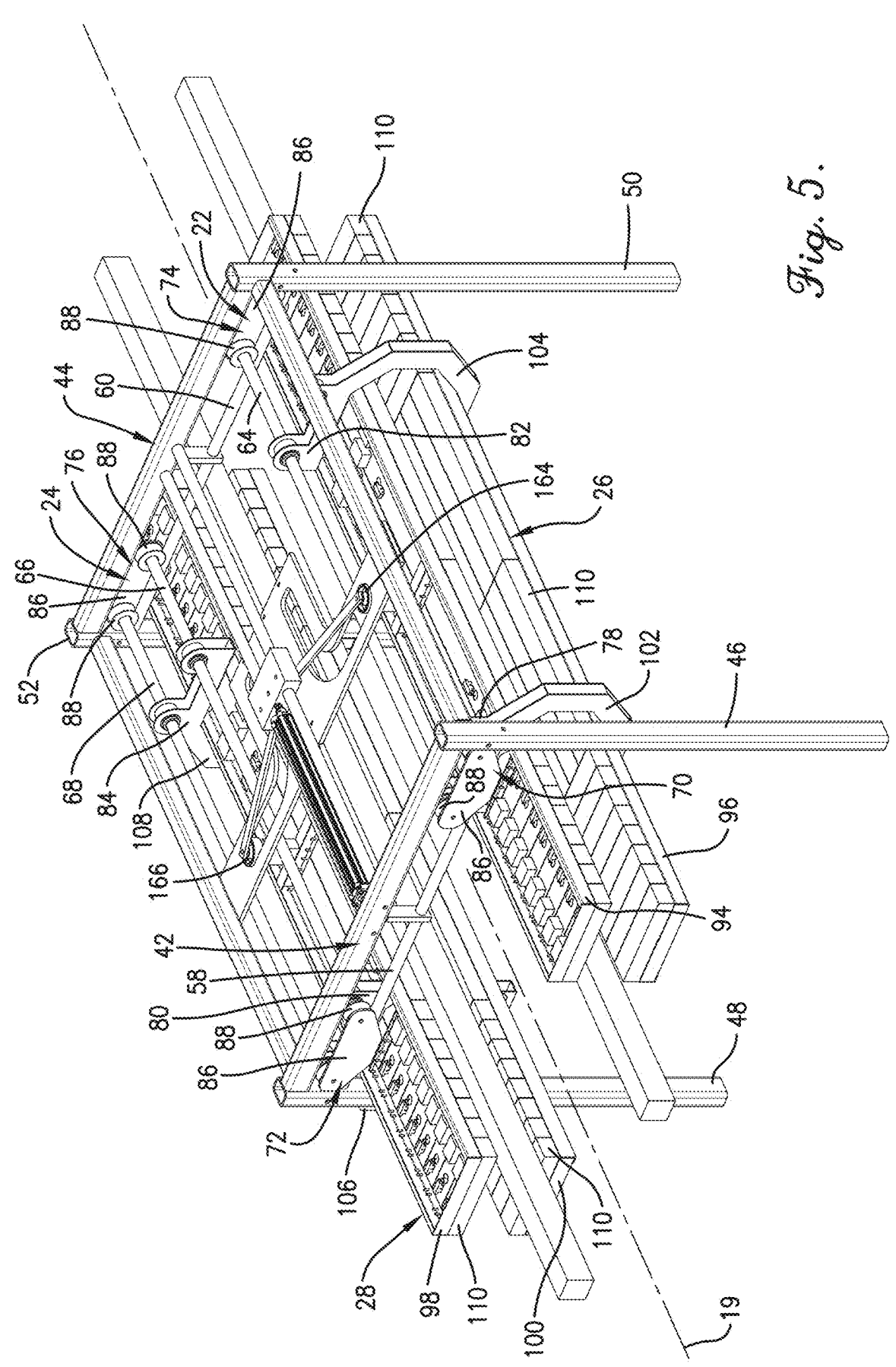
FIG. 5 is an elevated perspective view of the thermoformer oven of FIG. 1 with its heating elements in a separated state.

Turning to FIG. 5, in one or more embodiments, the carriage assemblies 22, 24 include one or more lateral rails 58, 60, one or more longitudinal rails 62, 64, 66, 68, one or more lateral carriages 70, 72, 74, 76, and one or more longitudinal carriages 78, 80, 82, 84. In one or more embodiments, the lateral rails 58, 60 are attached to the legs 46, 48, 50, 52 of the gantries 42, 44 so that they extend transversely to the rails 16, 18 and/or the longitudinal axis 19, and the longitudinal rails 62, 64, 66, 68 are movably supported on the lateral rails 58, 60 via the lateral carriages 70, 72, 74, 76.

However, the rails 58, 60, 62, 64, 66, 68 may be configured any number of ways without departing from the scope of the present invention. For example, the longitudinal rails 62, 64, 66, 68 may be secured to the gantries 42, 44 and the lateral rails 58, 60 may be shiftably supported on the longitudinal rails 62, 64, 66, 68 via longitudinal carriages. Further, one or more of the rails 58, 60, 62, 64, 66, 68 may be integrated into the frame 20 of the thermoformer oven 10 or thermoformer system. In one or more embodiments, the rails 58, 60, 62, 64, 66, 68 comprise cylindrical shafts. However, the rails 58, 60, 62, 64, 66, 68 may comprise any number of different types of guiding and/or support elements without departing from the scope of the present invention, such as tracks, bars, beams, slide rails, or the like.

Figure 6:
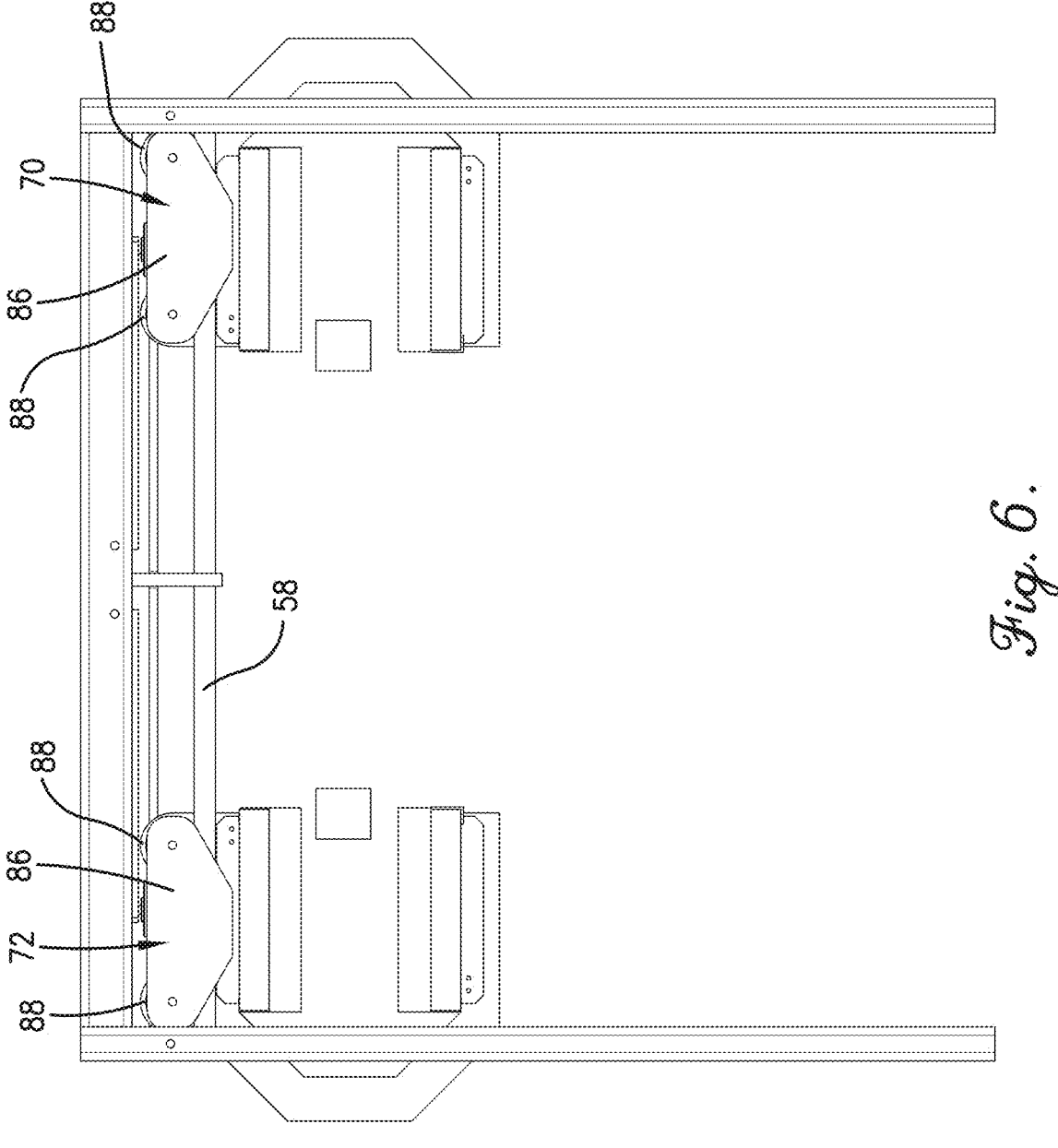
FIG. 6 is an end view of the thermoformer oven of FIG. 1 with its heating elements in the separated state viewed along the longitudinal axis that extends into the page.

Turning to FIG. 6, in one or more embodiments, the lateral carriages 70, 72, 74, 76 are shiftably coupled with the lateral rails 58, 60. The lateral carriages 70, 72, 74, 76 include end plates 86 connected to the ends of the longitudinal rails 62, 64, 66, 68 and guide rollers 88 rotatably connected to the longitudinal rails 62, 64, 66, 68 and operable to roll along the lateral rails 58, 60.

Figure 7:
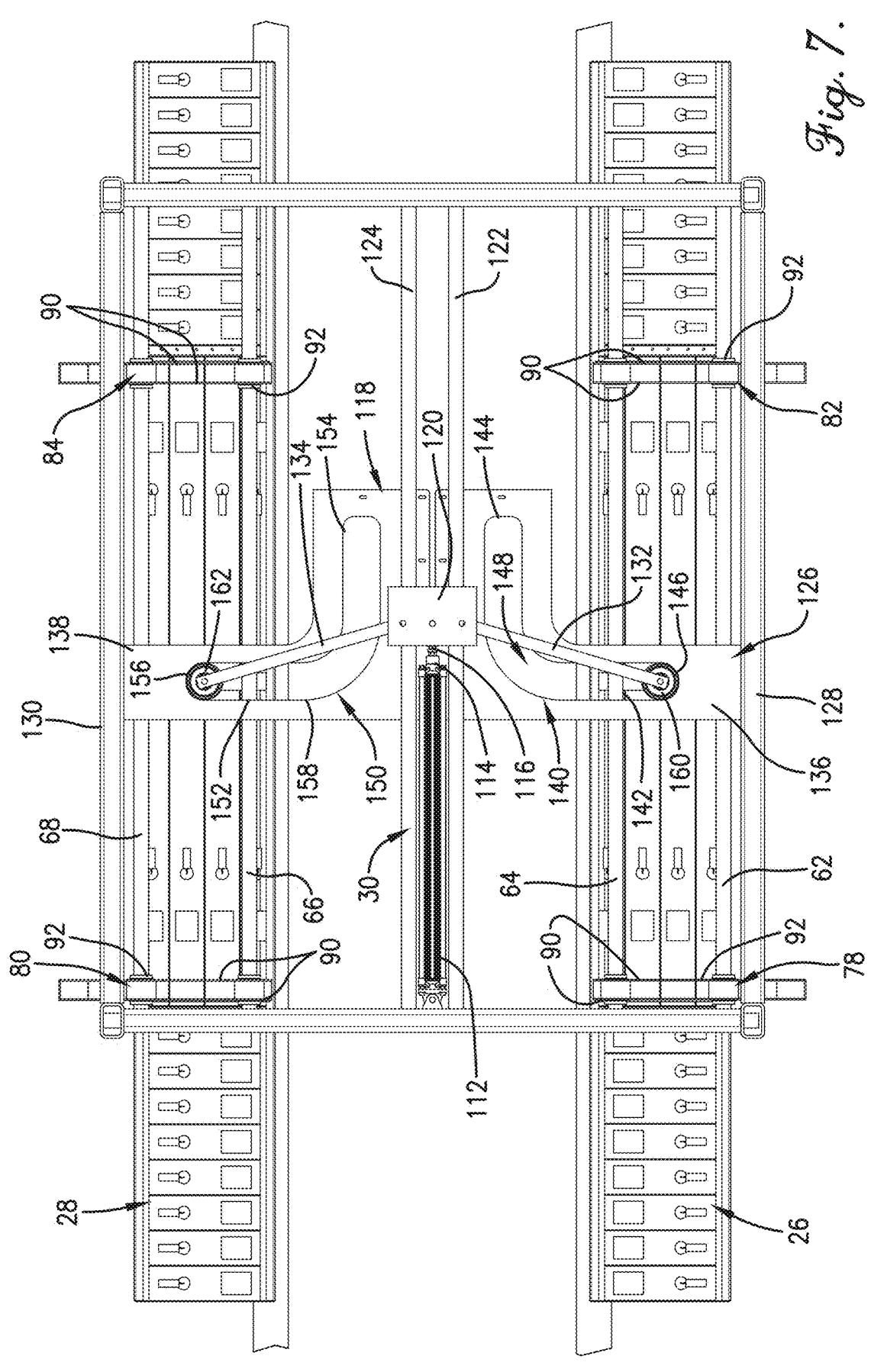
FIG. 7 is a top plan view of the thermoformer oven of FIG. 1 with its heating elements in the separated state.

Turning to FIG. 7, in one or more embodiments, the longitudinal carriages 78, 80, 82, 84 are shiftably coupled with the longitudinal rails 62, 64, 66, 68 and are connected to and support the heater banks 26, 28. The longitudinal carriages 78, 80, 82, 84 include frame plates 90 supported on linear-motion bearings 92 coupled to the longitudinal rails 62, 64, 66, 68.

While the carriages 70, 72, 74, 76, 78, 80, 82, 84 are depicted as sharing one or more of the rails, the carriages may be shiftably coupled with portions of different rails without departing from the scope of the present invention. Further, the carriages may additionally or alternatively be shiftably coupled to portions of the frame 20, such as one or more of the girders 54, 56.

Turning briefly back to FIG. 5, in one or more embodiments, the heater banks 26, 28 include heater bank frames 94, 96, 98, 100, connecting bars 102, 104, 106, 108, and a plurality of heating elements 110. The heater bank frames 94, 96 are proximal heater bank frames connected by connecting bars 102, 104. Heater bank frames 98, 100 are distal heater bank frames connected by connecting bars 106, 108. In one or more embodiments, each of the frames 94, 96, 98, 100 is independently connectable to its respective connecting bars 102, 104, 106, 108 so that each frame 94, 96, 98, 100 can be removed individually for maintenance. The heating elements 110 are supported on the frames 94, 96, 98, 100 and may comprise any type of heater known in the art, including ceramic heaters, quartz heaters, infrared heaters, tubular heaters, coil heaters, halogen heaters, or the like.

Turning back to FIG. 7, in one or more embodiments, the one or more actuator 30 is configured to shift the heater banks 26, 28 toward one another. In one or more embodiments, the one or more actuator 30 is also configured to shift the heater banks 26, 28 in directions with vector components of motion parallel to the longitudinal axis 19. In one or more embodiments, the one or more actuator 30 is a single linear actuator with a drive cylinder 112 that extends and retracts an actuating rod 114 with an actuating end 116. However, any number of actuators may be used without departing from the scope of the present invention. The one or more actuator 30 may include a mechanical actuator, a pneumatic actuator, a hydraulic actuator, an electrical actuator, or the like.

In one or more embodiments, the thermoformer oven 10 further includes a guide assembly 118 for guiding movement of the heater banks 26, 28. The guide assembly 118 includes a guide block 120, one or more longitudinal guide rails 122, 124, a guide track 126 connected to rails 128, 130 of the frame 20, a pair of link arms 132, 134. The guide block 120 is connected to the actuating end 116 of the linear actuator 30 and is shiftably coupled with the longitudinal guide rails 122, 124. The guide block 120 may be shiftably coupled with the rails 122, 124 any number of ways without departing from the scope of the present invention. For example, the guide block 120 may include channels for receiving the rails 122, 124 and/or linear-motion bearings. The guide rails 122, 124 are supported on the frame 20 and extend parallel to the longitudinal axis 19 and/or rails 16, 18.

The guide track 126 includes a proximal portion 136 and a distal portion 138. The proximal portion 136 defines a slot 140 having a lateral portion 142 and a longitudinal portion 144 connected together in a curved L-shape. The lateral portion 142 extends transversely relative to the longitudinal axis 19 with a proximal end 146 located proximal to the proximal rail 128 of the frame 20 and a distal end 148 located opposite to the proximal end 146 and proximal to the longitudinal guide rails 122, 124. The longitudinal portion 144 of the slot 140 extends from the distal end 148 of the lateral portion 142 and towards the press 14.

In one or more embodiment, the distal portion 138 of the guide track 126 likewise defines a slot 150 that mirrors the slot 140 of the proximal portion 136. The slot 150 has a lateral portion 152 and a longitudinal portion 154 connected together in a curved L-shape. The lateral portion 152 extends transversely relative to the longitudinal axis 19 with a distal end 156 located proximal to the distal rail 130 of the frame 20 and a proximal end 158 located opposite to the distal end 156 and proximal to the longitudinal guide rails 122, 124. The longitudinal portion 154 of the slot 150 extends from the proximal end 158 of the lateral portion 152 and towards the press 14.

The link arms 132, 134 are pivotally connected to the guide block 120 and to their respective heater banks 26, 28. Specifically, the proximal link arm 132 is pivotally connected to the proximal heater bank 26 and to the guide block 120, and the distal link arm 134 is pivotally connected to the distal heater bank 28 and to the guide block 120. In one or more embodiments, the link arms 132, 134 are connected to their respective heater banks 26, 28 via the proximal and distal guides 160, 162. The guides 160, 162 are mounted on the frames of their respective heating banks 26, 28 and are configured to shift along their respective slots 140, 150. The guides 160, 162 may include wheels 164, 166 (best shown in FIG. 5), bearings, slides, or the like for shiftably moving within the slots 140, 150.

When the actuator 30 extends the actuating end to shift the guide block 120 longitudinally along the rails 122, 124, the guide block 120 pulls the link arms 132, 134 with it. The link arms 132, 134 in turn pull the guides 160, 162 and therefore the heater banks 26, 28. The track 126 directs the guides 160, 162 along the slots 140, 150 so that the heater banks 26, 28 travel in a direction along the lateral portions of the slots 140, 150 toward one another, and then travel in a direction along the longitudinal portions of the slots 140, 150 so that heater banks 26, 28 shift parallel to the longitudinal axis 19 towards the press 14. When the actuator 30 retracts the actuating end, the heater banks 26, 28 follow the path in reverse: they shift away from the press 14 and then separate from each other.

While the guide block 120 is depicted as connected to the actuating rod 114, the actuating end 116 may be either end of the actuator 30 without departing from the scope of the present invention. For example, the actuating end 116 may alternatively be the drive cylinder 112 connected to the guide block 120, and the rod 114 may be connected to the frame 20 so that actuation causes the drive cylinder 112 and therefore the guide block 120 to shift.

Figure 8:
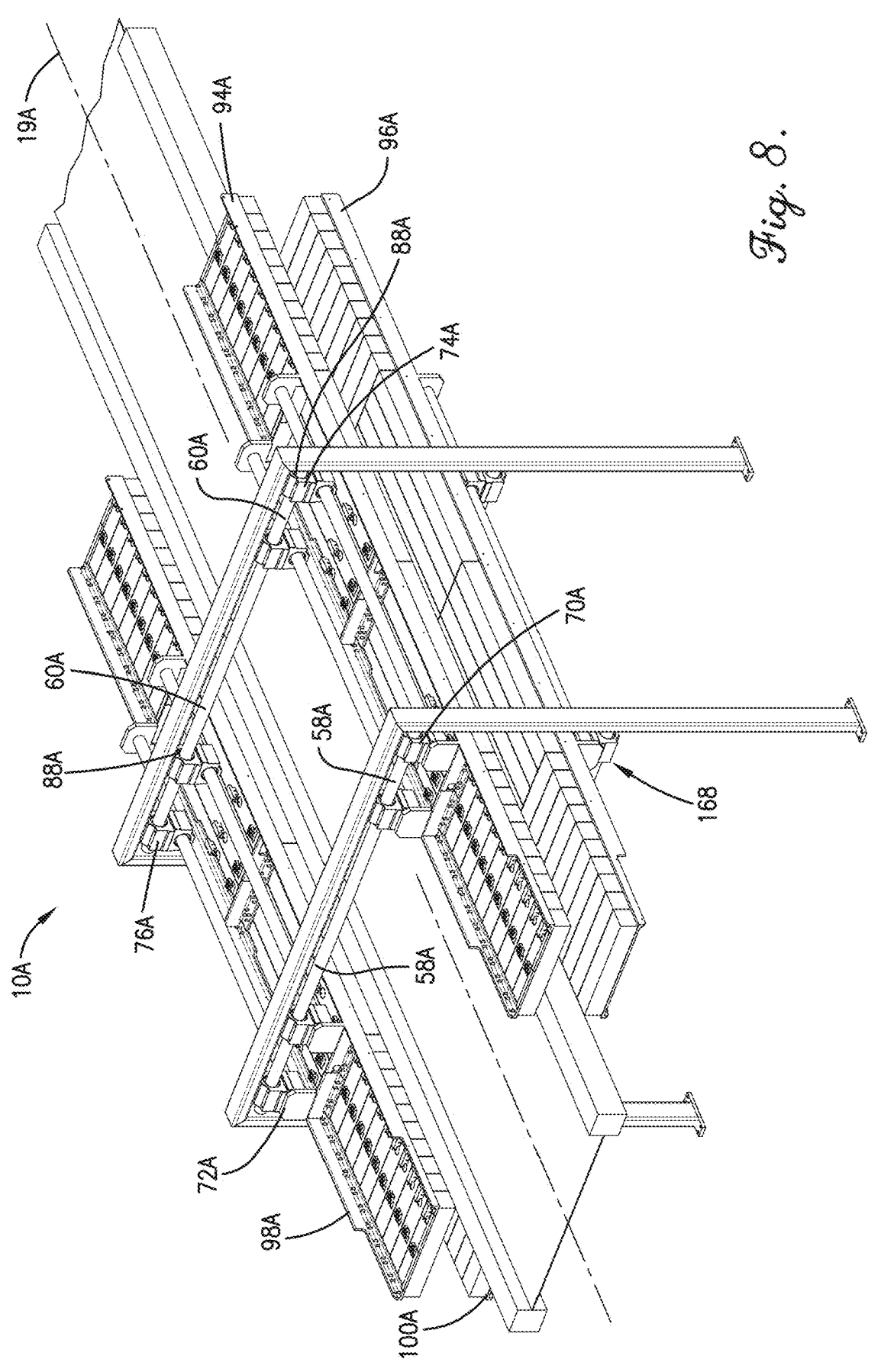
FIG. 8 is a perspective view of a thermoformer oven according to another embodiment of the present invention.
Figure 9:
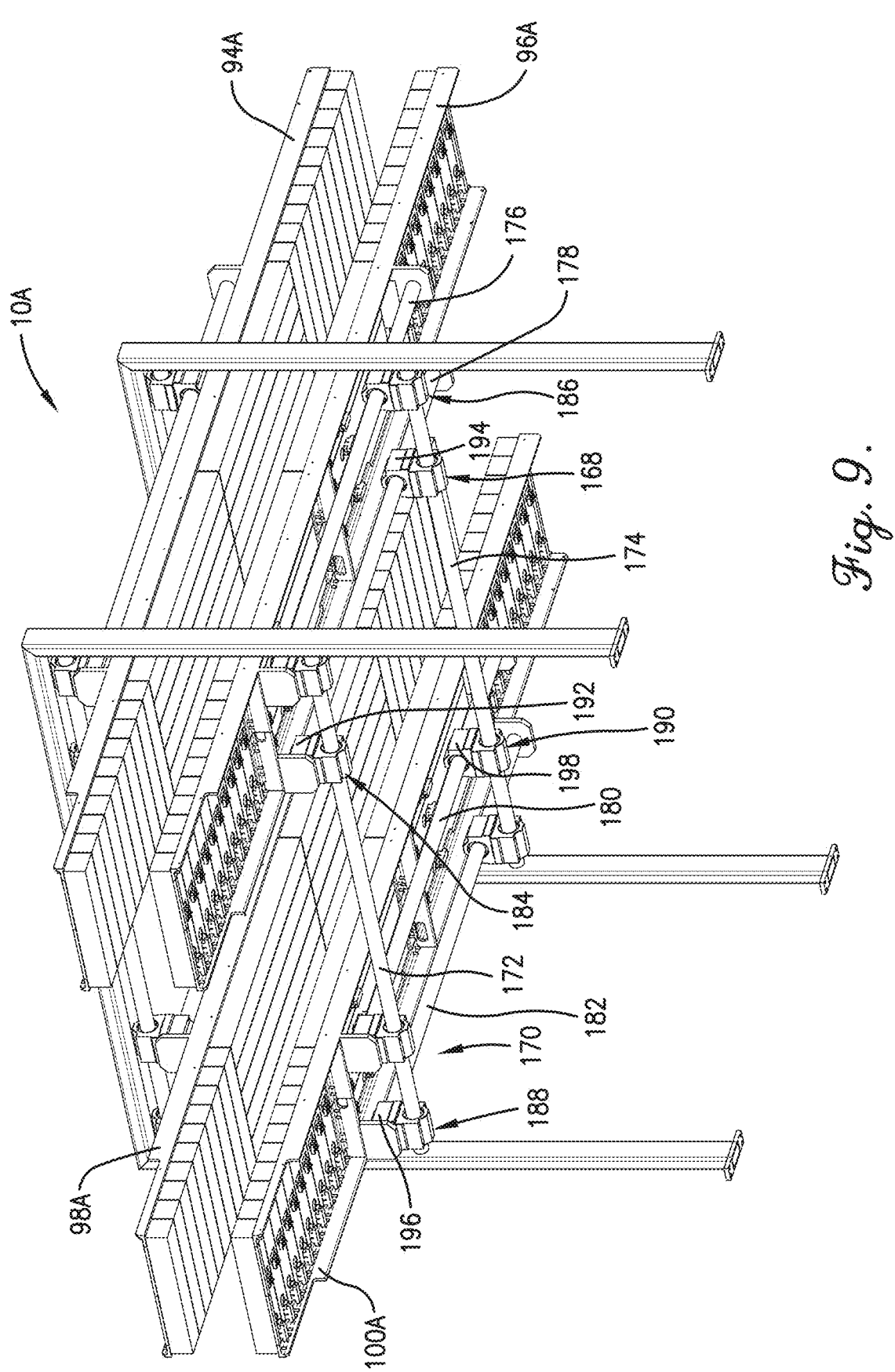
FIG. 9 is a lowered perspective view of the thermoformer oven of FIG. 8.

A thermoformer oven 10A constructed in accordance with another embodiment of the invention is shown in FIGS. 8 and 9. The thermoformer oven 10A comprises some similar components as thermoformer oven 10; thus, the components of thermoformer oven 10A that correspond to similar components in thermoformer oven 10 have an 'A' appended to their reference numerals.

The thermoformer oven 10A is substantially similar to thermoformer oven 10 except that the heater bank frames 94A, 96A, 98A, 100A are each independently shiftable in directions transverse to the longitudinal axis 19A and in directions parallel to the longitudinal axis 19A. This is accomplished by the lower heater bank frames 96A, 100A having their own carriage assemblies 168, 170. The carriage assemblies 168, 170 include one or more lateral rails 172, 174, one or more longitudinal rails 176, 178, 180, 182, one or more lateral carriages 184, 186, 188, 190, and one or more longitudinal carriages 192, 194, 196, 198. Further, instead of guide rollers 88, the lateral carriages 70A, 72A, 74A, 76A, 184, 186, 188, 190 include linear-motion bearings 88A shiftably coupled with the lateral rails 58A, 60A, 172, 174.

Figure 10:
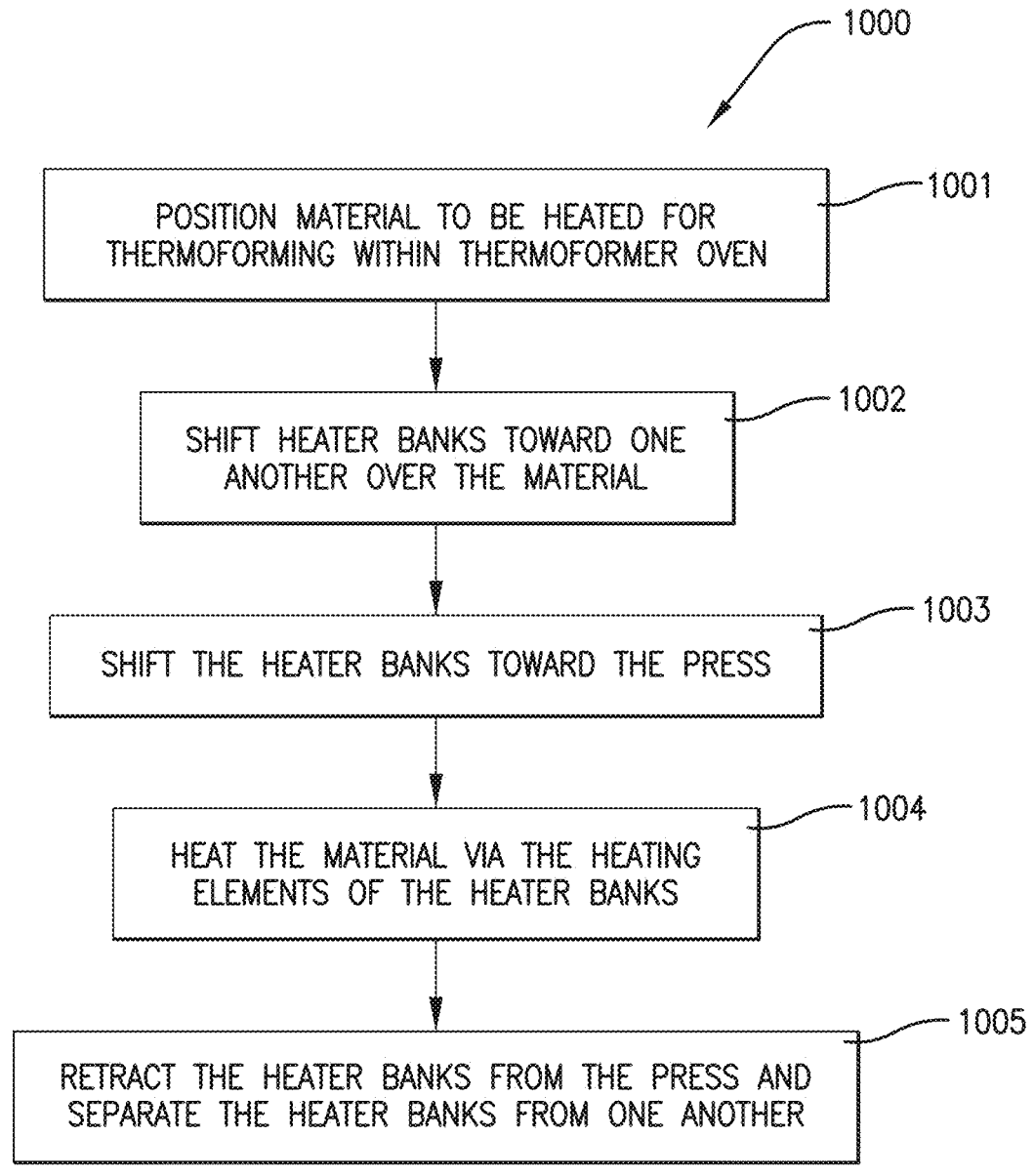
FIG. 10 is a flowchart depicting exemplary steps of a method according to an embodiment of the present invention.

The flow chart of FIG. 10 depicts the steps of an exemplary method 1000 of heating material for thermoforming. In some alternative implementations, the functions noted in the various blocks may occur out of the order depicted in FIG. 10. For example, two blocks shown in succession in FIG. 10 may in fact be executed substantially concurrently, or the blocks may sometimes be executed in the reverse order depending upon the functionality involved. In addition, some steps may be optional.

The method 1000 is described below, for case of reference, as being executed by exemplary devices and components introduced with the embodiments illustrated in FIGS. 1-9. The steps of the method 1000 may be performed by a control system through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium (s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 1001, the material to be thermoformed is positioned within the thermoformer oven. The material may be positioned on the first side of a surface in the thermoforming oven, such as on the rails.

Referring to step 1002, the one or more actuator actuates to shift the heater banks together. The actuation causes the heater banks to shift toward one another in directions with vector components of motion parallel to the surface of the material and/or the surface supporting the material. In one or more embodiments, the actuation causes the heater banks to shift toward one another transversely relative to the longitudinal axis and parallel to the upper surface supporting the material. In one or more embodiments, the heater banks are shifted using only a single actuator and the guide assembly. The heater banks may be actuated until they meet or abut one another. This may be at a midway point between the heater banks, such as a point that lies on an imaginary plane that intersects the longitudinal axis and is at a midway point between the rails and/or the support legs of the gantries. However, the heater banks may be actuated any number of distances without departing from the scope of the present invention. Additionally, the heater banks may be actuated to meet at any point above the material without departing from the scope of the present invention.

Referring to step 1003, the one or more actuator may actuate the heater banks to extend toward the press of the thermoformer system. The actuator may actuate so that the heater banks shift in directions parallel to the longitudinal axis to heat portions of the material next to and/or within the press of the thermoformer system. The heater banks may be held in that position for a predetermined period of time and/or until the material reaches a desired temperature. The material is moved into the press once it has reached the desired temperature.

Referring to step 1004, the material for thermoforming is heated by the heating elements. The heater banks may be held over the material for a predetermined period to heat the material to a desired temperature. This step may include activating the heating elements in the heater banks and/or adjusting their power output to increase or decrease their temperature.

Referring to step 1005, the one or more actuator actuates to shift the heater banks apart from one another. This step may include retracting one or more actuating rods of the one or more actuators. The one or more actuator may cause the heater banks to retract away from the press and then shift away from one another.

The method 1000 may include additional, less, or alternate steps and/or device(s), including those discussed elsewhere herein.

Although the invention has been described with reference to example embodiments illustrated in the attached drawing figures, it is noted that equivalents may be employed and substitutions made herein without departing from the scope of the invention as described and claimed herein.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112 (f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

The invention claimed is:

1. An apparatus for supporting heating elements of a thermoformer oven, the apparatus comprising:

a first heating element support frame operable to support one or more of the heating elements on a first side of a surface for supporting material to be thermoformed;

a second heating element support frame operable to support one or more of the heating elements on the first side of the surface;

one or more actuator configured to shift the first and second heating element support frames toward one another in directions with vector components of motion parallel to the surface, wherein the one or more actuator is a linear actuator configured to extend and retract an actuating end;

a first rail portion extending along a lateral axis that is parallel to the surface;

a second rail portion spaced apart from the first rail portion along the lateral axis;

a first carriage shiftably coupled to the first rail portion and supporting the first heating element support frame;

a second carriage shiftably coupled to the second rail portion and supporting the second heating element support frame;

a first support bar operatively associated with the first heating element support frame;

a second support bar operatively associated with the second heating element support frame;

a third heating element support frame operatively associated with the first support bar and operable to support one or more of the heating elements on a second side of the surface for supporting material to be thermoformed;

a fourth heating element support frame operatively associated with the second support bar and operable to support one or more of the heating elements on the second side of the surface;

a first link arm rotatably coupled to the actuating end of the one or more actuator and the first heating element support frame; and a second link arm rotatably coupled to the actuating end of the one or more actuator and the second heating element support frame.

2. The apparatus of claim 1, further comprising:

one or more longitudinal rail portion extending transversely to the first and second rail portions; and one or more longitudinal carriages shiftably coupled to the one or more longitudinal rail portion and operatively associated with the first and second heating element support frames, wherein the one or more actuator is configured to extend the actuating end so that the first and second heating element support frames shift toward one another and along the one or more longitudinal rail portion.

3. A thermoformer oven comprising:

a rail for supporting material to be thermoformed along an imaginary plane and including a first side and a second side opposite to the first side;

a first heating element positioned on the first side of the rail;

a second heating element positioned on the first side of the rail;

one or more actuator configured to shift the first and second heating elements toward one another in directions with vector components of motion parallel to the imaginary plane, wherein the one or more actuator is a linear actuator configured to extend and retract an actuating end;

a first rail portion extending along a lateral axis that is parallel to the imaginary plane;

a second rail portion spaced apart from the first rail portion along the lateral axis;

a first carriage shiftably coupled to the first rail portion and supporting the first heating element;

a second carriage shiftably coupled to the second rail portion and supporting the second heating element;

a first support bar operatively associated with the first heating element;

a second support bar operatively associated with the second heating element;

a third heating element operatively associated with the first support bar and positioned on the second side of the rail;

a fourth heating element operatively associated with the second support bar and positioned on the second side of the rail;

a first link arm rotatably coupled to the actuating end of the one or more actuator and the first heating element; and a second link arm rotatably coupled to the actuating end of the one or more actuator and the second heating element.

4. The thermoformer oven of claim 3, further comprising:

one or more longitudinal rail portion extending transversely to the first and second rail portions; and one or more longitudinal carriages shiftably coupled to the one or more longitudinal rail portion and operatively associated with the first and second heating elements, wherein the one or more actuator is configured to extend the actuating end so that the first and second heating elements shift toward one another and along the one or more longitudinal rail portion.

5. A thermoformer oven comprising:

one or more surface extending along a longitudinal axis for supporting material to be heated;

a frame comprising one or more gantry extending parallel to the one or more surface and transversely relative to the longitudinal axis;

a proximal carriage assembly configured to shift along the one or more gantry;

a distal carriage assembly positioned distal to the proximal carriage assembly and configured to shift along the one or more gantry, wherein the proximal carriage assembly and the distal carriage assembly are configured to shift along the longitudinal axis;

a proximal heater bank operatively associated with the proximal carriage assembly;

a distal heater bank operatively associated with the distal carriage assembly;

one or more actuator configured to shift the proximal carriage assembly and the distal carriage assembly toward one another along the one or more gantry, wherein the one or more actuator comprises a linear actuator with an actuating end;

a guide block operatively associated with the actuating end;

a proximal link arm pivotally connected to the guide block and the proximal heater bank;

a distal link arm pivotally connected to the guide block and the distal heater bank;

a guide track supported on the frame and defining:

a proximal slot including:

a lateral portion extending transversely relative to the longitudinal axis with a first end proximal to the guide block and a second end opposite to the first end, and a longitudinal portion extending parallel to the longitudinal axis from the first end of the lateral portion, and a distal slot including:

a lateral portion extending transversely relative to the longitudinal axis with a first end proximal to the guide block and a second end opposite to the first end, and a longitudinal portion extending parallel to the longitudinal axis from the first end of the lateral portion;

a proximal guide operatively associated with the proximal heater bank and extending into the proximal slot; and a distal guide operatively associated with the distal heater bank and extending into the distal slot.

6. The thermoformer oven of claim 5, wherein the proximal link arm is pivotally connected to the proximal heater bank via the proximal guide, and the distal link arm is pivotally connected to the distal heater bank via the distal guide.

7. The thermoformer oven of claim 6, wherein the one or more surface is define by a pair of rails extending parallel to one another.

8. The thermoformer oven of claim 7, wherein the one or more gantry includes:

a left gantry with a pair of left legs straddling the pair of rails and a left girder extending between the pair of left legs; and a right gantry spaced apart from the left gantry along the longitudinal axis, the right gantry including a pair of right legs straddling the pair of rails and a right girder extending between the pair of right legs.

9. The thermoformer oven of claim 8, further comprising a left lateral shaft extending between the pair of left legs, and a right lateral shaft extending between the pair of right legs.

10. The thermoformer oven of claim 9, wherein the proximal carriage assembly comprises:

one or more proximal shaft shiftably supported by the left lateral shaft and the right lateral shaft; and one or more proximal heater bank frame member shiftably supported by the one or more proximal shaft and supporting the proximal heater bank.

11. The thermoformer oven of claim 10, wherein:

the distal carriage assembly comprises:

one or more distal shaft shiftably supported by the left lateral shaft and the right lateral shaft; and one or more distal heater bank frame member shiftably supported by the one or more distal shaft and supporting the distal heater bank, the one or more proximal shaft and the one or more distal shaft are supported by the left lateral shaft and the right lateral shaft via guide rollers, and the one or more proximal heater bank frame member and the one or more distal heater bank frame member are shiftably supported by the one or more proximal shaft and the one or more distal shaft, respectively, via one or more linear bearings.

* * * * *